H. P. KROEKER.
TRAIN PIPE COUPLING.
APPLICATION FILED OCT. 2, 1915.
1,177,419.
Patented Mar. 28, 1916.
2 SHEETS—SHEET 1.
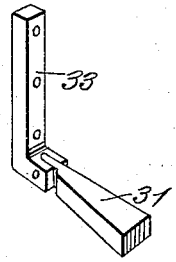
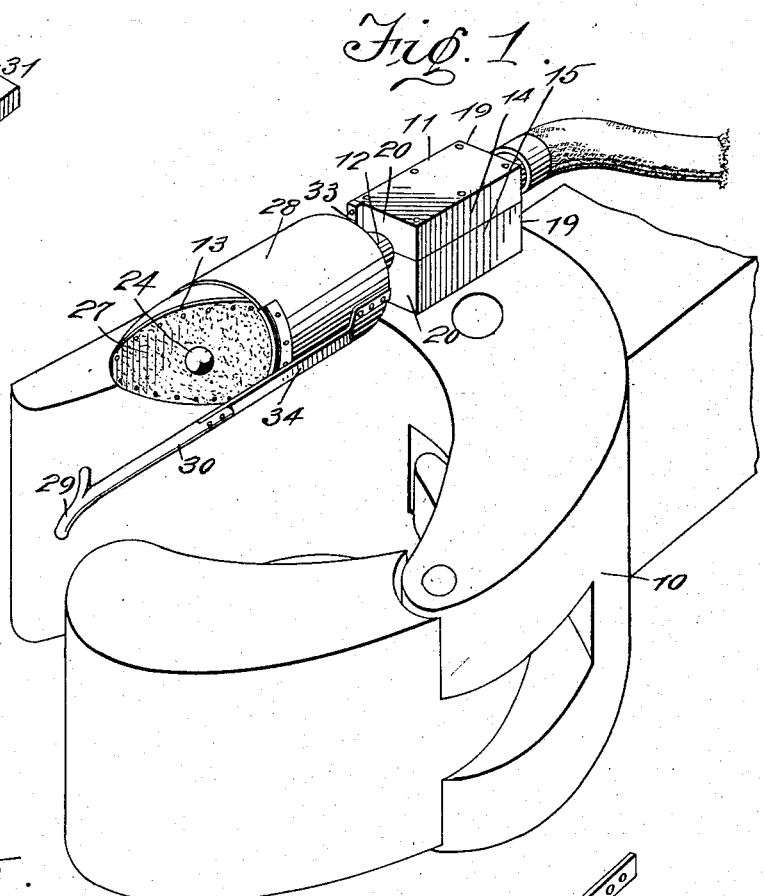
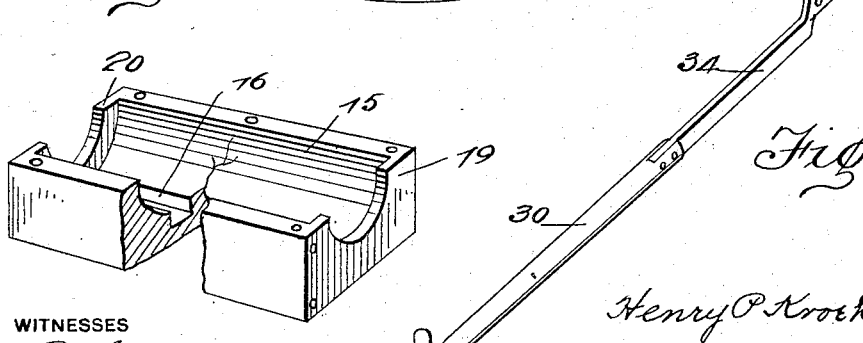
INVENTOR
Henry P Kroeker,
BY Richard Owen,
ATTORNEY
WITNESSES

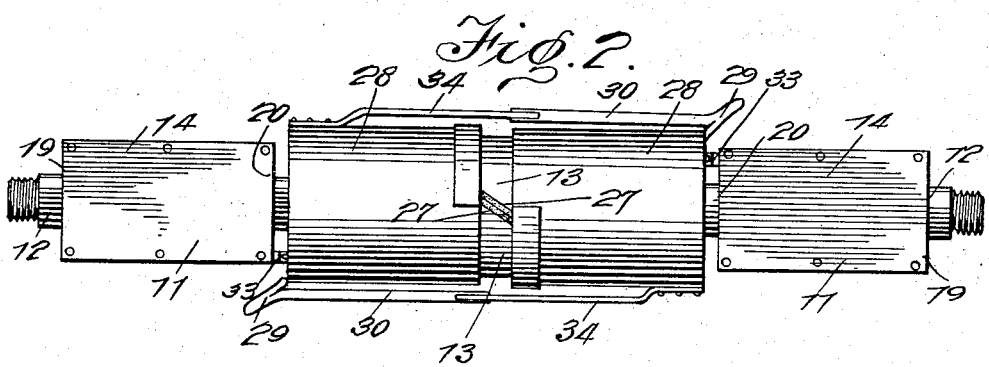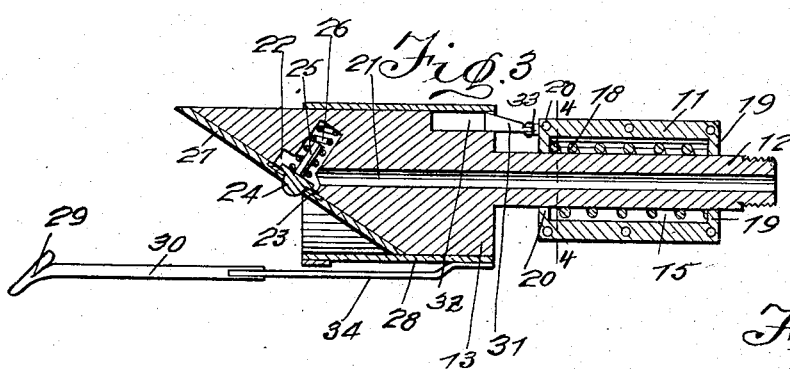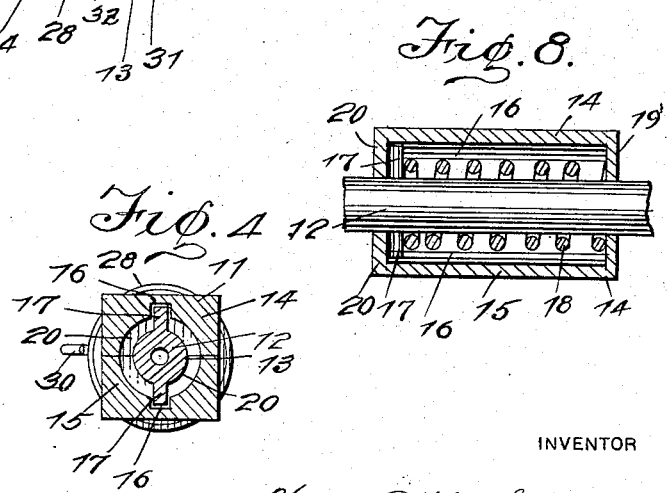

UNITED STATES PATENT OFFICE.

HENRY P. KROEKER, OF NEWTON, KANSAS.

TRAIN-PIPE COUPLING.

1,177,419.                 Specification of Letters Patent.      Patented Mar. 28, 1916.

Application filed October 2, 1915.   Serial No. 53,799.

*To all whom it may concern:*

Be it known that I, HENRY P. KROEKER, a citizen of the United States, residing at Newton, in the county of Harvey and State of Kansas, have invented certain new and useful Improvements in Train-Pipe Couplings, of which the following is a specification.

This invention relates to an improved train pipe coupling which is used for connecting the air pipes of the various cars in a train and the principal object of the invention is to provide a coupling which is so constructed that the air pipes may be very tightly connected but at the same time so connected that when the car couplers are released the air pipe couplers will also be released thus preventing danger of the air pipes being damaged when uncoupling a car.

Another object of the invention is to so construct the air pipe couplings that they will be connected at the same time that the cars are coupled thus making it unnecessary for the train men to step between the cars or under the cars in order to connect the air pipes and turn on the valves.

Another object of the invention is to so mount these couplings that they will have sufficient play to permit of vibration longitudinally of the train without any danger of damage to the couplers or air pipes.

This invention is illustrated in the accompanying drawings, wherein:—

Figure 1 is a view in perspective showing a car coupler provided with one of the improved air pipe couplings. Fig. 2 is a view in top plan of two of the couplers joined. Fig. 3 is a longitudinal sectional view through one of the couplers. Fig. 4 is a vertical sectional view taken along the line 4—4 of Fig. 3. Fig. 5 is a perspective view of one of the sections of the bearing box which slidably mounts one of the couplings. Fig. 6 is a perspective view of one of the latches for releasably holding the two couplers in engagement as shown in Fig. 2. Fig. 7 is a perspective view of the trigger used for moving the latch of Fig. 6 to an inoperative position. Fig. 8 is a longitudinal sectional view through one of the bearing boxes with the coupler stem shown in elevation.

The air pipe couplers are identical in construction and therefore a description of the detail construction of one will suffice for both. These couplers are carried by the train couplers one of which is shown in Fig. 1 indicated by the numeral 10. This simply illustrates a conventional form of train coupler and may be varied in its construction according to the wishes of the party controlling the train couplers on the cars. The box which is indicated in general by the numeral 11 is rigidly secured to coupling 10 in any suitable manner. This boxing or housing as it might be called forms a bearing for the shank or stem 12 of the coupler 13 and is formed of the two sections 14 and 15, each of which is placed as shown in Fig. 5 and provided with a longitudinally extending groove 16 to receive the ribs 17 of the stem 12. Therefore the coupler 13 will be prevented from rotating and getting out of the proper position. In order to yieldably hold the valve in the position shown in Fig. 3 there is provided a spring 18 which spring is positioned in the housing 11 and has one end portion engaging the end walls 19 and the opposite end portion engages the lugs or ribs 17 as shown in Fig. 8. The end walls 20 serve as abutments for the fingers 17 and prevent the coupling from moving beyond a desired extent in one direction.

The coupler 13 which is slidably mounted as already described is provided with an air passage 21 which communicates with a pocket 22 covered by a plate 23. The valve 24 which is to close the opening formed in the cover plate 23 is provided with a stem 25 which stem extends through the spring 26 serving to yieldably hold the valve in the closed position as shown in Fig. 3. It will thus be seen that the passage of air through the coupler will normally be prevented but that when the two couplers are brought together the outer end portions of the valves which are rounded as clearly shown in Fig. 3 will engage and the two valves will be moved to an open position thus permitting air to pass freely from one coupler to another. A facing 27 formed of leather or any other material which will provide a tight joint is provided to prevent any danger of leakage.

When the cars are coupled the cars will be connected by means of the usual couplers indicated in Fig. 1 by the numeral 10 and the train pipes of the air brake system will be connected by means of the improved couplers as shown in Fig. 2. When these couplers are brought together the pointed outer end portions of the two couplers 13 slip into the collars 28 and the leather facings 27 are brought into very tight engagement. The hooked ends 29 of the latches 30 engage the collars and the couplers will then be held in tight engagement. Of course, if the cars are coupled the air pipe couplings will be brought into engagement before the car couplers are connected and therefore in order to permit the car couplers to be tightly connected the stem 12 must slip through the bearings 11. This will cause the springs 18 to be compressed and the air pipe couplers will therefore be permitted to have a certain amount of sliding movement which is necessary to prevent danger of leakage. It should be further noted that when the cars are coupled and the air pipes coupled the cam triggers 31 will be moved into the pockets 32 out of the way of the hooked ends of the latches 30. These cam triggers are connected with the bearings 11 by means of the brackets 33 and will move with the bearings so that when the cars are uncoupled the triggers will move outwardly thus engaging the hooked ends of the latches and moving them outwardly to release the two couplers and permit them to disconnect. As these latches are carried by the springs 34 they will of course return to their normal position and again engage the couplers when the couplers are brought together. I have therefore provided an air pipe coupler which is so constructed that the two couplers may be connected without it being necessary for a trainman to go between the cars and have further so constructed these couplers that when connected the valves will be automatically opened and when disconnected the valves will be automatically closed. It will be further noted that these couplers are so constructed that when a car is uncoupled from the rest of the train the air pipe couplers will be disconnected thus preventing danger of damage to the air pipes in case a car should break loose from the rest of the train by accident. It should be further noted that by the provision of the valve shown in Fig. 3 the air pipes will be normally closed and therefore the accidental detaching of one car will not interfere with the operation of the air brake system on the rest of the train.

What is claimed is:—

1. The combination of a car coupler, a bearing carried by said car coupler, a trigger carried by said bearing, an air pipe coupler provided with a stem extending through said bearing, the interior of said bearing being provided with longitudinally extending grooves and the stem of said coupler being provided with fingers extending into the grooves to prevent rotation of the stem in said bearing, and a spring in said bearing positioned about said stem and engaging said fingers to yieldably hold said coupling in a normal position.

2. An air pipe coupling comprising a bearing, a coupling having a stem slidably mounted in said bearing and yieldably held in a normal position, said coupling being provided with a passageway communicating with a pocket at the outer end face of the coupling, the outer end face of the coupling being cut at an incline, a perforated covering plate for said pocket, a facing for the inclined outer end of said coupling provided with an opening registering with the opening of said plate, a valve positioned in said pocket and having a reduced and rounded end extending through the registering openings of said plate and facing, a collar carried by said coupling and extending in spaced relation to the inclined face of said coupling, a yieldably mounted latch secured to said collar, and a trigger carried by said bearing.

3. A train pipe coupling comprising a bearing, a coupler head having a stem slidably mounted in the bearing and yieldably held in a normal position, said head and stem being provided with a passageway communicating with a passage in the outer end of the head, a perforated cover for said pocket, a yieldably held valve for said pocket extending through the opening in the cover thereof, a collar carried by said head, and means for releasably holding the coupler head in engagement with a second coupler head, and means for moving the last mentioned means to an inoperative position.

4. A coupling for air pipes comprising a bearing, a trigger extending from said bearing and having a cam face, a coupler head having a stem slidably connected with said bearing and provided with a pocket to receive the trigger, the coupler head being provided with a valve controlled air passage, and a yieldably mounted latch extending from said coupler head for engaging a second coupler head to releasably connect the coupler heads, the latch when in engagement with the second coupler head being positioned adjacent the trigger of the second coupler whereby movement of the trigger out of its pocket will release the latch.

5. A coupler for air pipes comprising a set of bearings, coupler heads slidably connected with said bearings and yieldably held in a normal position, the outer end portions of the coupler heads being cut at an incline, said coupler heads being provided with valve controlled air passages, the valves of which engage to open the air passages when the coupler heads are connected, a collar carried by each of the coupler heads for holding the coupler heads in close contact when coupled, means for releasably connecting the coupler heads, and means carried by said bearings for moving said last mentioned means to an inoperative position.

In testimony whereof I affix my signature in presence of two witnesses.

HENRY P. KROEKER.

Witnesses:
JOHN F. MAY,
WILLIAM D. MAY.

Copies of this patent may be obtained for five cents each, by addressing the "Commissioner of Patents, Washington, D. C."